Nov. 4, 1941.  J. G. BLUNT  2,261,641
STEAM SUPPLY PIPE FOR ARTICULATED LOCOMOTIVES
Filed April 12, 1941  2 Sheets-Sheet 1
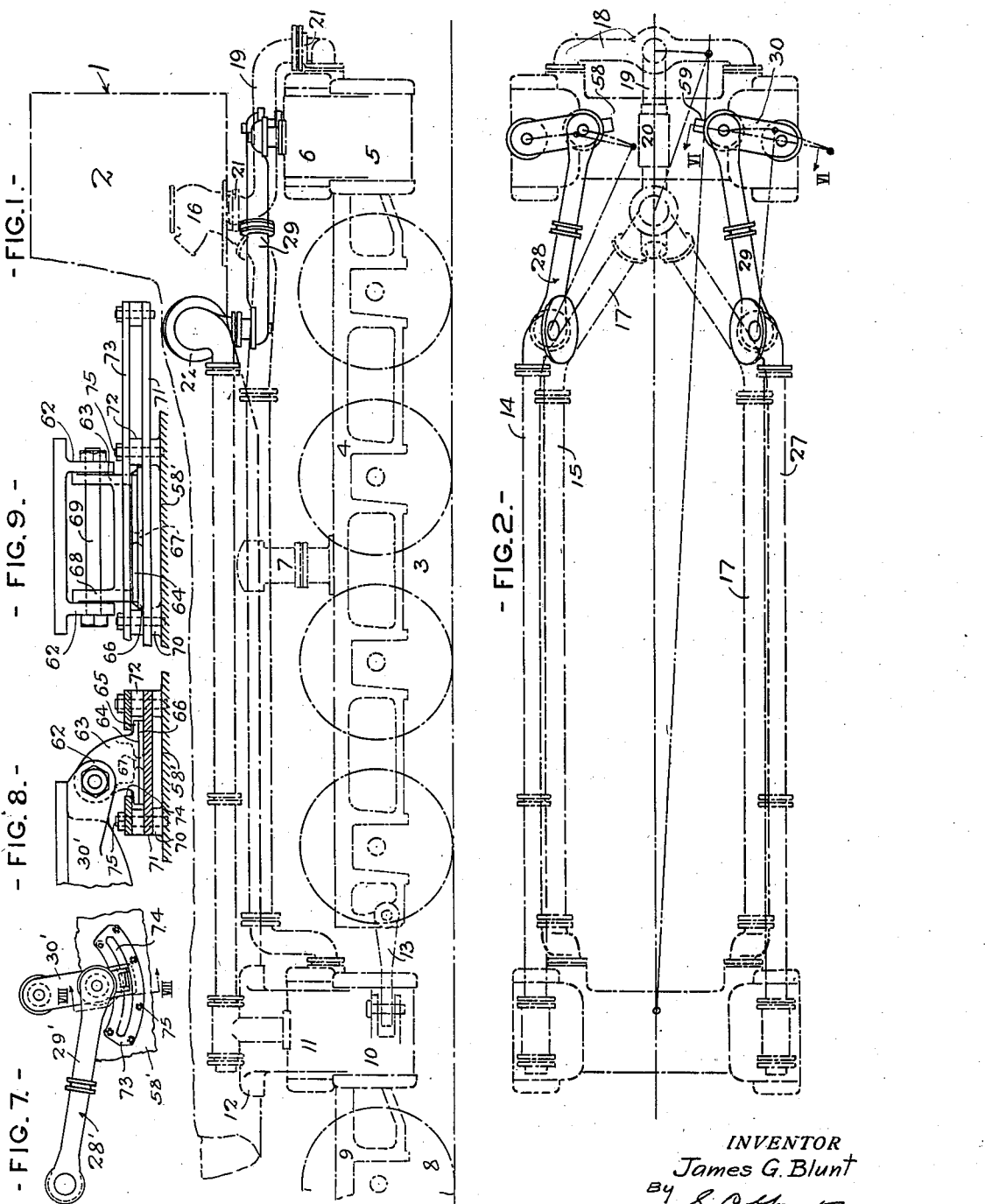
INVENTOR
James G. Blunt
BY
S. C. Yeaton
ATTORNEY Nov. 4, 1941.    J. G. BLUNT    2,261,641
STEAM SUPPLY PIPE FOR ARTICULATED LOCOMOTIVES
Filed April 12, 1941    2 Sheets-Sheet 2
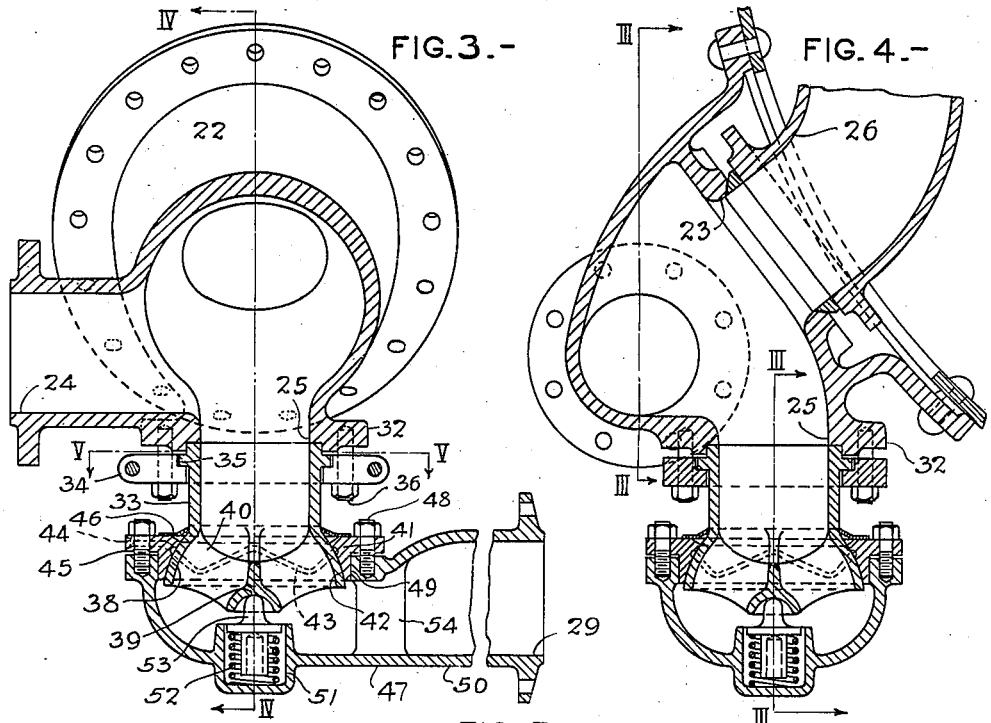
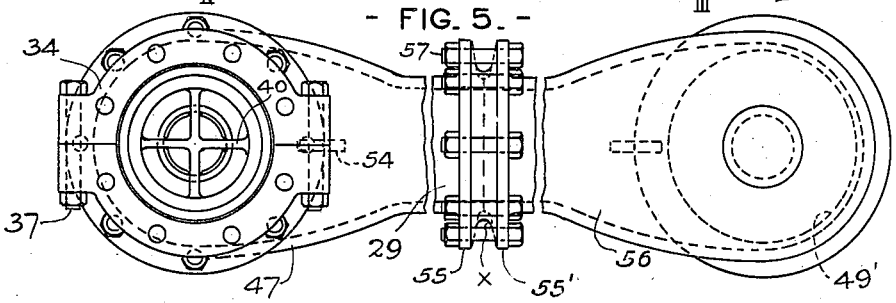
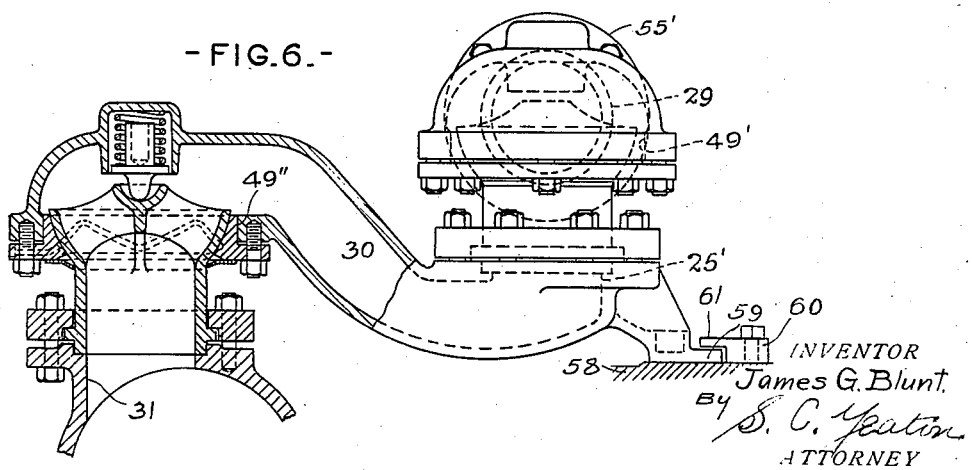
INVENTOR
James G. Blunt.
BY
ATTORNEY Patented Nov. 4, 1941

2,261,641

UNITED STATES PATENT OFFICE 2,261,641

STEAM SUPPLY PIPE FOR ARTICULATED LOCOMOTIVES

James G. Blunt, Schenectady, N. Y., assignor to American Locomotive Company, New York, N. Y., a corporation of New York Application April 12, 1941, Serial No. 388,233

3 Claims. (Cl. 105—47)

This invention relates to fluid pressure articulated conduits and more particularly to steam conduits for articulated steam locomotives.

Conventional fluid pressure articulated conduits, such as for instance as conduits shown in my Patent 1,798,131, dated March 31, 1931, ordinarily include a pipe section connected to a boiler by a universal joint articulation, and a pipe section connected to a valve chest by an articulation providing swinging in one plane only, the two pipe sections being connected together at their adjacent ends by a second universal joint articulation. Each universal joint articulation includes a spherical ball member and a spherical socket member. Exemplifications of the three joints are shown in the patent to H. S. Burnham, No. 1,838,740, dated December 29, 1931.

It is an object of the present invention to provide, in an articulated locomotive, an improved articulated sectional pipe for supplying steam to the steam chest of a power cylinder, the pipe being connected to the chest by a universal joint providing flexibility at this joint in all directions. Preferably a universal joint is also provided at the opposite end of the pipe and between the sections of the pipe.

A further object is to provide a universal joint for the purposes aforesaid of the ball and socket type comprising two metal members, each formed of only a portion of, or at least no more than, a hemisphere, the ball and socket members engaging each other by metal to metal contact, the ball and socket joints at the several articulations being preferably similar and interchangeable.

A further object is to provide, in a ball and socket universal joint as above mentioned, a universal joint at the center of the hemisphere portions (more strictly the center of the sphere) formed of a socket-like member and an engaging ball-like member, and yielding means forcing one of said members against the other of said members, said members being carried each by one of the members of the conduit ball and socket joint whereby the conduit joint members are yieldingly held together by pressure applied at the above mentioned center at any angularity of the joint, thereby providing means for holding the conduit joint members together in the absence of steam in the conduit, the steam, when in the conduit, being relied upon for holding the conduit joint members together and insuring a tight joint therebetween when in service.

Other and further objects of this invention will appear from the following description, the accompanying drawings and the appended claims.

Referring to the drawings forming a part of this application, Figure 1 is a diagrammatic fragmental side elevation of an articulated steam locomotive of the Mallet type, indicated in dot and dash lines, embodying the present invention shown in full; Fig. 2 is a diagrammatic plan view of the fluid pressure articulated conduit, the remainder of the steam pipe system and the cylinders and valve chests being indicated in dot and dash lines, and the position of the parts on curved track being indicated in dot and dash lines; Fig. 3 is an enlarged section taken on the lines III—III of Fig. 4, parts being shown in full, a part being broken, and other parts omitted, showing a portion of the articulated conduit; Fig. 4 is a section on the line IV—IV of Fig. 3, parts being shown in full and other parts added; Fig. 5 is a broken view of a pipe section of the conduit, being at the left a section on the line V—V of Fig. 3, showing a portion of the pipe section, and at the right a plan view of the remainder of the pipe section; Fig. 6 is an enlarged section on the line VI—VI of Fig. 2, parts being shown in full, parts being broken away, and the guard for the conduit-supporting foot being added; and Figs. 7, 8 and 9 show a modified supporting foot and guard, Fig. 7 being a plan of the articulated conduit, supporting foot and guard, Fig. 8 being an enlarged section on the line VIII—VIII of Fig. 7, parts being shown fragmentally and other parts removed, and Fig. 9 being an elevation viewed from the right of Fig. 8, parts being shown fragmentally.

Referring to Fig. 1 of the drawings, an articulated steam locomotive of the Mallet type, indicated generally by the reference numeral 1, is there shown diagrammatically. It comprises a steam generator or boiler 2, a forward power unit or engine 3 having side frame members 4, power cylinders 5, with steam valve chests 6 connected together on opposite sides of the power unit by a flat top cross member, a transversely slidable boiler support 7, and a rear power unit or engine 8 having side frame members 9, power cylinders 10, steam valve chests 11 and a cross member and cylinder saddle construction 12, connecting the cylinders 10 on opposite sides of the rear power unit. The rear power unit is rigidly secured to the boiler for movement therewith as a unit and the forward power unit is articulated to the rear power unit by the usual articulation link 13 for lateral swinging movement of the forward power unit relative to the rear power unit and boiler when entering curved track.

The locomotive has a supply steam pipe system 14, and an exhaust steam pipe system 15. The latter is of conventional design and includes an outlet 16 disposed in the smoke-box of the locomotive in the usual manner, pipes 17 extending thereto from the rear steam chests, a pipe 18 connected at its ends to each of the forward steam chests, and a pipe 19 connecting the pipe 18 with the outlet 16. Pipe 19 is made in two sections connected together by a sliding sleeve 20 permitting the length of pipe 19 to vary, the rear section being connected to the outlet 16 and the forward section being connected to the pipe 18 by articulated joints 21. These articulated joints together with the sliding sleeve 20 permit the forward power unit to move laterally relative to the boiler and the pipes 17 in the usual manner insofar as the exhaust steam pipe system 15 is concerned.

The supply steam pipe system 14 is formed of two separate parts, one on each side of the locomotive, and as these parts are similar a description of one is deemed sufficient, namely, the part on the right hand side of the locomotive. It includes a coupling 22, best shown in Figs. 3 and 4, connected to the side of the boiler. The coupling has three ports 23, 24 and 25, port 23 being connected to the source of steam supply by a pipe 26, port 24 being connected to the rear chest 11 by a pipe 27 and port 25 being connected to the forward chest 6 by a sectional conduit constituting the present invention, later to be more fully described, port 25 forming an open mouth for steam supply from the boiler to the forward valve chest.

The pipe 27 is formed of a plurality of rigidly connected parts and is carried rigidly by the boiler and rear right steam chest. This pipe is of a well-known design, as more fully set forth in my aforementioned patent, and no further description thereof is deemed necessary. Suffice it to say that the parts are bolted together, permitting easy disassemblage for cleaning and inspection.

The coupling 22 and associated pipes and universal joint articulated connections connecting port 25 to the valve chest form a fluid pressure articulated sectional conduit indicated generally by the reference numeral 28.

The present invention is comprised in the fluid pressure articulated conduit 28. The conduit, as will presently be seen, is formed of four pipe-like parts or sections. The conduit is formed of a sectional pipe 29 connected at its outer or rear end to the port 25, and a pipe 30 connected at its outer end to a mouth or port 31 in the valve chest 6. At its inner end pipe 30 is connected to the inner or forward end of pipe 29. The pipes 29 and 30, which are substantially horizontal, form sections of the conduit 28 and are always at an angle to each other. Thus there are three connections in the fluid pressure articulated conduit, namely the connection of pipe 29 with the coupling 22, the connection of pipe 30 with the valve chest and the connection between the pipes 29 and 30. Each of these connections is by a ball and socket type universal joint articulation, these three connections forming an important part of the present invention.

Referring first to the connection between pipe 29 and coupling 22, best shown in Figs. 3 and 4, it will be seen that the coupling has a bolting flange 32 surrounding the port 25. A ball-carrying hollow member 33, forming a third section of the conduit, is secured to this flange by a split ring 34, the ring overlapping a flange 35 formed on the end of the member 33 adjacent the flange 32 and being secured thereto by stud bolts 36. The sections of the ring 34 are secured together by bolts 37 (Fig. 5). An open-ended horizontal metal ring or ball 38 having an exterior convex face is formed on the other end of the member 33. As is clearly shown in Fig. 3, this ball is in configuration, part of a hemisphere, the spherically-shaped wall of the ball diverging outwardly from the port 25, and this shape is an important part of the present invention, it being contemplated that the ball be a hemisphere or less in shape, but no larger, preferably in the form of a ring. Thus all parts of the ball lie on the same side of a great circle. The use of such a ball reduces the height of the ball over the conventional shape now in use, as for instance the ball shown in the before mentioned patents, and this reduction in height enables a more compact, simple, economical and efficient structure with a corresponding reduction in the number of parts. The member 33 is hollow, permitting the passage of steam therethrough, but at the center of the ball, is formed a socket member 39 connected to the wall of the ball by webs 40. The socket member 39 may be lined at its concave face in any desired manner by removable wear resisting material (not shown).

A metal ring or socket member 41, having a concave face 42 concentric with the ball and in metal to metal engagement therewith is carried by the ball. As the ball 38 is formed from a hemisphere, only one socket member 41 is required, this being a decided advantage. An oil groove 43 is formed in the face 42 and communicates with an oil orifice 44 which extends through the wall of the socket member 41 and through a bolting flange 45 formed thereon, opening at its outer end to the exterior, at which end may be secured a lubricant fitting (not shown), of any standard and well-known make. A washer-shaped lubricant retainer 46 engages the socket member and the ball 38 for preventing the loss of oil therefrom and entrance of foreign matter to the joint.

A pipe section 47, forming one part of the sectional pipe 29, is secured to the socket member 41 by stud bolts 48, the studs passing through the bolting flange 45. Pipe section 47 has an upwardly directed opening 49, circular in shape, into which the socket member 41 projects so that the socket member 41 in effect forms a part of the pipe section 47. Socket member 41 thereby secures pipe section 47 to member 33. The bottom wall 50 of pipe section 47 has formed therein a cylinder 51 in which is disposed a spring 52 and plunger 53, the spring forcing the plunger upward in spring-pressed engagement with the socket member 39. Thus the plunger moves with the socket member 41 whereas the socket member 39 moves with the ball 38.

The point of contact of the plunger with the socket member 39 is at the center of the ball 38 and on the axis of the member 33 and cylinder 51, thereby permitting the ball to rock around the point of the plunger in substantially frictionless contact, and the pressure of the spring is sufficient to keep the ball in engagement with the socket member 41. The plunger and socket member 39 provide a universal joint, leaving the spring 52 unaffected by rotation of the ball 38 in its socket member 41. The ball 38 and socket member 41 provide a universal joint articulation permitting any desired angle of relative rotation between the pipe 29 and the coupling 22. The live supply steam pressure in the articulated conduit maintains a fluid-tight metal to metal engagement between the ball 38 and socket member 41, no soft packing being employed, so that the main function of the spring and plunger is merely to hold this engagement when the steam pressure is relieved. The pipe section 47 is reinforced adjacent the opening 49 by a web 54. At its other end it has a bolting flange 55.

A similar pipe section 56 is secured to the pipe section 47 by bolts 57 passing through the bolting flange 55 and through a similar flange 55' of section 56 and by a sealing weld x. This section 56, however, is oppositely disposed to the section 47, that is to say, its opening or mouth 49' at its inner end is directed downwardly (Fig. 5). It is connected to the adjacent inner end of pipe 30 in a manner similar to the manner in which pipe section 47 is connected to coupling 22, and no detailed description thereof is deemed necessary. Suffice it to say that it has a similar horizontal universal joint articulation (except that it is inverted) so that the pipe 29 can have universal movement relative to pipe 30 as well as to coupling 22. However any rocking movement about its axis will be slight, the pressure of the steam at the joints tending to preserve a substantially normal position. Pipe 30 at this end is formed similar to coupling 22, its port 25' providing a mouth opposite mouth 49'.

The outer end of pipe 30 is connected to the valve chest, as aforesaid, by a universal joint articulation which is similar (except that it is inverted) to the previously described universal joint articulation at the coupling 22, and no detailed description is deemed necessary. Suffice it to say that this outer end of pipe 30 is formed similarly to the outer end of pipe section 47 which is adjacent coupling 22, the opening 49" at this end of pipe 30 being downwardly directed. The valve chest, adjacent port 31, is formed similarly to the corresponding part of coupling 22, port 31 being opposite opening 49". The ball of this articulation has a ball-carrying hollow member similar to the member 33, which forms the fourth section of the conduit.

The inner end of pipe 30 connected to the inner end of pipe 29 slides relative to the cylinders during passage of the locomotive through curved track, it being the purpose of the aforedescribed three universal joint articulations to permit this movement. This inner end of pipe 30 is supported on the aforementioned cross member, indicated by the reference numeral 58 by a foot 59 which is formed integrally with pipe 30 and slides on the flat top of the cross member which provides a seat for the foot which is likewise flat at its bottom face.

The foot 59 is shown in Fig. 2 but is better shown enlarged in Fig. 6 where a guard 60 is shown bolted to the cross member 58. The guard has a flange 61 overriding foot 59 preventing the adjacent or inner end of the pipe 30 from being twisted or lifted off its seat on the cross member 58.

Figs. 7, 8 and 9 show a modified foot and guard. The pipe 30' of the conduit 28' is provided at its inner end with a pair of spaced orificed lugs 62. The foot 63 comprises a base 64 having laterally extended flanges 65 to which base is secured a wear plate 66 in any desired manner as by welding and/or rivets, a rivet 67 being shown. Lugs 68 project upwardly from the base 64, one adjacent each of the lugs 62 at the inner side thereof, the lugs 68 having orifices in alignment with the orifices of the lugs 62.

A bolt 69 extends through the orifices pivotally connecting the foot 63 to the pipe 30'. The cross member 58' is provided with bosses 70 upon which seats a plate 71 which supports the foot 63. Upon the plate 71 and in line with the bosses 70 are thimbles 72 upon which is supported a plate 73. The plate 73 is provided with an arcuate slot 74 through which the lugs 68 extend, the plate at each side of the slot overlapping the flanges 65 in slight vertical spaced relation therewith. Studs 75 pass through the plate 73, thimbles 72 and plate 71 and are screwed into the bosses 70, the nuts on the end of the studs firmly holding the parts together.

The pivotal connection between the foot 63 and the pipe 30' in conjunction with the universal joints at the ends of the pipe 30' insures an even seating of the foot upon the plate 71 without producing any binding of the universal joints. The plate 73 prevents the foot from being lifted off its seat, and the grooves between the plates 71 and 73 provide for easy sliding of the flanges 65 therethrough, the arcuate slot 74 having its center at the vertical axis of the joint between the pipe 30' and the steam chest.

If desired a pivoted foot may be employed with only a single flange and overlapping retaining flange as shown in Fig. 6.

It will be noted that, as both joints of pipe 30 are universal joints, pipe 30 may rock bodily about its longitudinal axis relative to the valve chest 6 and pipe 29, thus insuring proper seating of foot 59 upon cross member 58 irrespective of irregularities in construction or assembling of associated parts that would otherwise prevent this proper seating. This is an added advantage of the present invention, it formerly being customary to provide the connection of pipe 30 to the valve chest for pivotal movement about a vertical axis only, in which case foot 59 could not of itself seek a level sliding engagement with the flat top of the cross member and straining of the parts with increased friction resulted.

Making the universal joint articulations of similar design is an added advantage of the present invention, the parts being interchangeable, thus effecting a decided economy in manufacture and requiring but a single spare part for replacement to be kept available. For similar reasons it has been found more economical to make the sections of pipe 29 similar. Pipe 29 has the further advantage that, because it is formed of two sections, each completely open at at least one end, the core employed in casting the section is easily removable through the completely open end.

While the improved universal joint has been shown in connection with a locomotive steam supply conduit, it will be understood that it has wider application and is not to be limited thereto in the claims unless so indicated. Furthermore while the universal joint at the steam chest has been shown and described in association with an articulated sectional pipe having but two sections, it may be employed in a conduit having a larger number of angling sections.

The invention claimed and desired to be secured by Letters Patent is:

1. In an articulated steam locomotive, the combination of a steam generator; a power truck unit, articulated relative to said generator, having a steam power cylinder at one side thereof provided with a steam chest, said chest having an open mouth for steam admission thereto and said generator, at a point spaced from said articulation, having an open mouth for steam supply therefrom to said chest; a sectional pipe connecting said mouths including a section for said admission mouth and another section for said supply mouth, said sections having open mouths at each of their ends, said admission mouth section having its outer end mouth articulated with said admission mouth and said supply mouth section having its outer end mouth articulated with said supply mouth, said sections being articulated together at their inner end mouths, the axes of said sections forming a substantially horizontal angle at the articulation of said inner end mouths; ball and socket type universal joints providing the articulations at both ends of said admission mouth section; a support for said admission mouth section pivotally secured to the inner end portion thereof, slidably engaging said power unit for supporting said sections at their inner end portions; and a guard secured to said power unit and coacting with said support, preventing lifting of said sections at their inner ends from said power unit.

2. In an articulated steam locomotive, the combination of a steam generator; a power truck unit provided with a steam power cylinder having a steam chest; a sectional steam pipe flexibly connected at one end to said generator for supply of steam to said pipe and at its other end to said steam chest for supply of steam to said chest, said pipe having two sections articulated together at their inner adjacent ends; a support for the inner ends of said pipe sections, hingedly connected to one of said sections at its said inner end and supported by said power unit in sliding relation therewith; and a guard secured to said power unit and coacting with said support, preventing lifting of said sections at their inner ends from said power unit.

3. In an articulated steam locomotive, the combination of a steam generator; a power truck unit, articulated relative to said generator, having a steam power cylinder at one side thereof and a fixed flat horizontal seat spaced laterally inwardly of said cylinder, said cylinder being provided with a steam chest, said chest having an open mouth for steam admission thereto and said generator, at a point spaced from said articulation, having an open mouth for steam supply therefrom to said chest; a sectional pipe connecting said mouths including a section for said admission mouth and another section for said supply mouth, said sections having open mouths at each of their ends, said admission mouth section having its outer end mouth articulated with said admission mouth and said supply mouth section having its outer end mouth articulated with said supply mouth, said sections being articulated together at their inner end mouths, the axes of said sections forming a substantially horizontal angle at the articulation of said inner end mouths, said admission mouth section having at its inner end a flat horizontal face slidably engaging said flat seat for support of said sections at their inner ends; and ball and socket type universal joints providing the articulations at both ends of said admission mouth section, permitting said admission mouth section to rotate about its axis to assure face to face contact between said horizontal face and its seat.

JAMES G. BLUNT.